United States Patent [19]
Bachel et al.

[11] 3,781,038
[45] Dec. 25, 1973

[54] TOW BAR FOR TOWING DISABLED SNOWMOBILES

[75] Inventors: Francis D. Bachel; Robert A. Voves, both of Hibbing, Minn.

[73] Assignee: E-Z Tow, Inc., Hibbing, Minn.

[22] Filed: June 12, 1972

[21] Appl. No.: 261,604

[52] U.S. Cl............................ 280/493, 280/491 D
[51] Int. Cl............................................ B62d 13/00
[58] Field of Search.................. 280/24, 491 D, 493, 280/494; 180/5

[56] References Cited
UNITED STATES PATENTS

| | | | |
|---|---|---|---|
| 2,139,970 | 12/1938 | Moore | 280/491 D |
| 3,083,040 | 3/1963 | Hayman | 280/493 R |
| 2,497,234 | 2/1950 | Mylie | 280/494 X |
| 2,916,301 | 12/1959 | Cushman | 280/491 D |
| 2,189,667 | 2/1940 | Kries | 280/493 R |

FOREIGN PATENTS OR APPLICATIONS

| | | | |
|---|---|---|---|
| 725,339 | 3/1955 | Great Britain | 280/493 |

OTHER PUBLICATIONS

Hall Distributing Co., 1972–1973 Catalog; page 19 "Tow Bar," to tow any disabled snowmobile.

Primary Examiner—David Schonberg
Assistant Examiner—Randall A. Schrecengost
Attorney—Ralph F. Merchant et al.

[57] ABSTRACT

Apparatus for towing disabled snowmobiles, comprising a triangular frame of two elongated rod members pivotally connected at their forward end and an extensible adjusting member transversely connected therebetween. One end of the extensible member is removably connected to permit collapse of the frame when not in use. Each of the rod members pivotally carries at its rearward end a slotted member constructed and arranged to receive and retain the edge of a snowmobile ski. A ball hitch disposed at the forward end pivotally connects the apparatus to a towing snowmobile.

6 Claims, 4 Drawing Figures

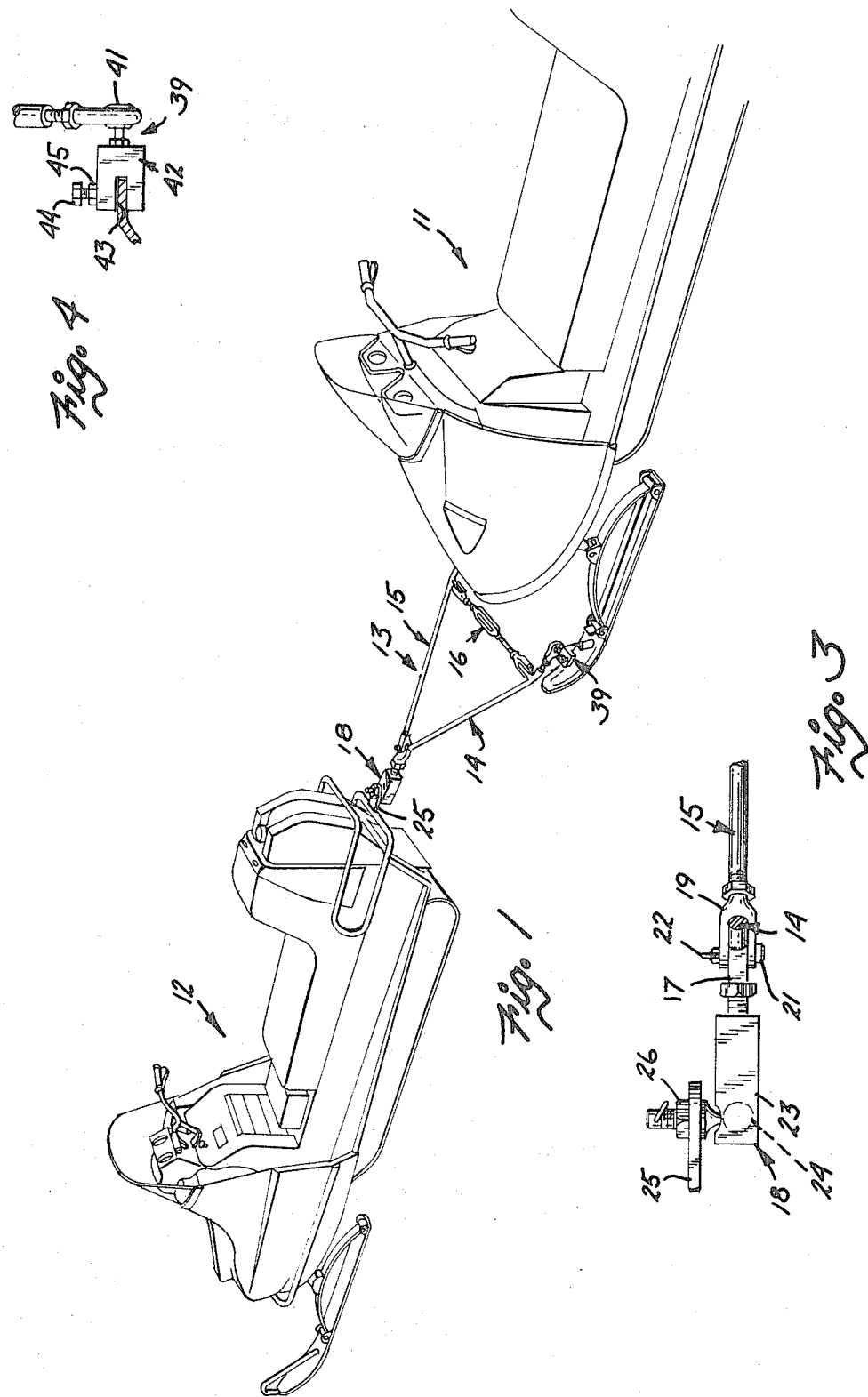

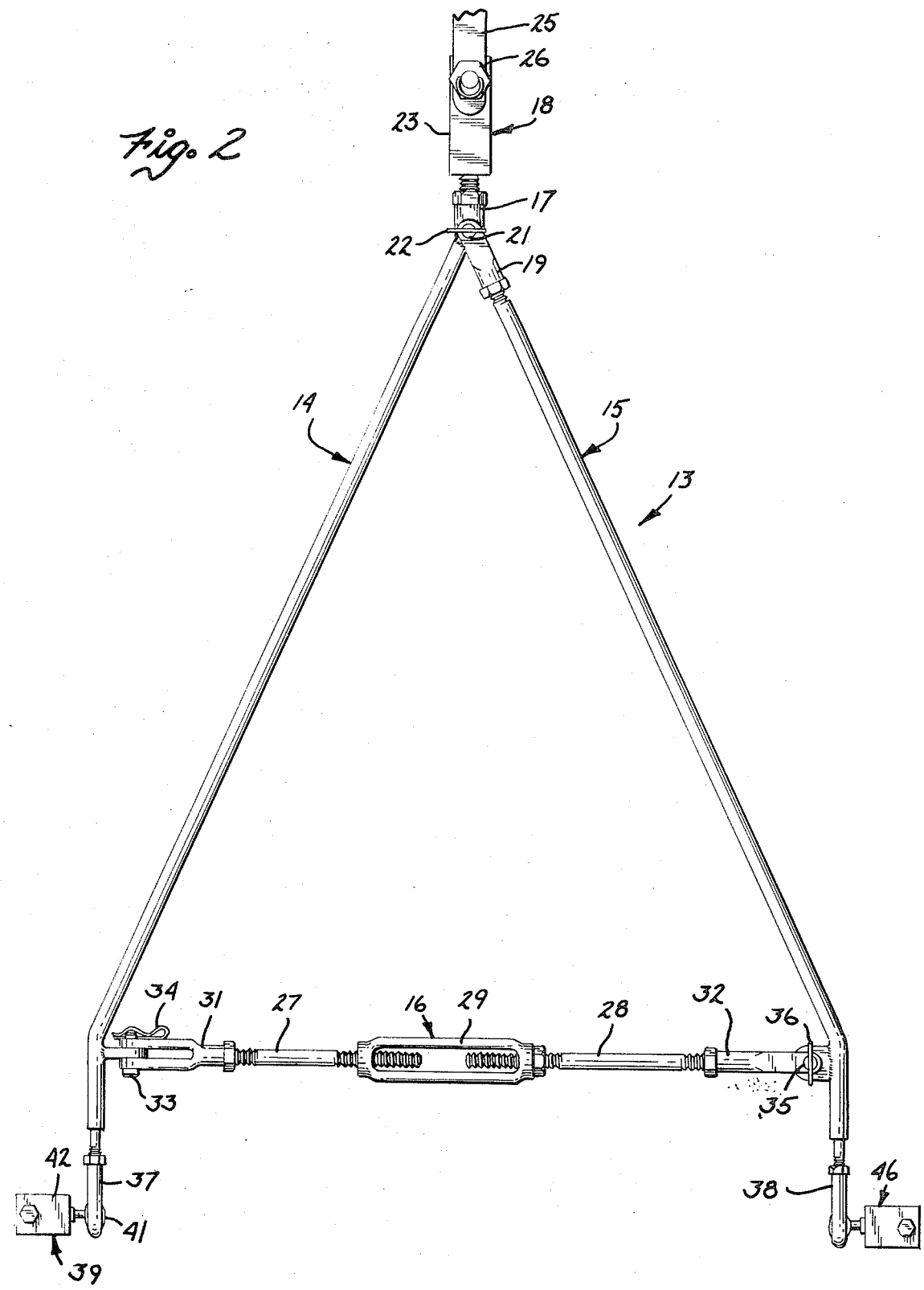

TOW BAR FOR TOWING DISABLED SNOWMOBILES

The invention is directed to apparatus for towing a disabled snowmobile.

Snowmobiles presently enjoy immense popularity both by reason of their recreational appeal and the simple ability to provide necessary transportation in snow covered areas where other vehicles cannot move. However, as all other transportation vehicles, the snowmobile breaks down periodically; and its capability to go where other vehicles cannot sometimes works to its disadvantage if the breakdown occurs in a remote location. Under such a condition, unless the necessary repairs can be made at the site, the disabled snowmobile is entirely dependent upon the help of another snowmobile to be towed back. Towing, however, is possible only if suitable towing equipment has been brought along, and this is usually not the case. Ropes and chains may be used for this purpose, but they are less than satisfactory due to their flexibility; and they can be extremely dangerous under braking conditions if there is no operator to stop the disabled snowmobile simultaneously. Tow bars may provide the desired function, but such existing devices are far too bulky to be carried by snowmobiles, which are relatively small and contain little storage space.

Our invention is therefore directed to a tow bar for towing disabled snowmobiles which is easily connected to a towing snowmobile and is adjustable to fit onto the skis of any disabled snowmobile in retaining relation therewith. The inventive tow bar comprises a triangular frame formed from pivotally connected rods which disconnect to collapse the unit to a storable size. The ski connecting members are quickly and easily fastened, and they are mounted to the frame with ball joints to permit multi-directional movement relative thereto. Although entirely collapsible, the tow bar is constructed to provide a rigid connection between the towing and towed snowmobiles, thereby obviating any possibility of uncontrolled and accidental movement of the towed machine during braking. Further, the use of ball joints at principal connecting points permits a good degree of independent movement between the snowmobiles over irregular terrain, thus enabling the towing operator to give his full attention to the control of his own vehicle. Our inventive tow bar is of an easily manufactured design, thus making it economically available to any snowmobile owner; and the fact that it is extremely simple to use makes it desirable additional equipment for all snowmobiles.

BRIEF DESCRIPTION OF THE DRAWINGS

FIG. 1 is a perspective view of a disabled snowmobile being towed by apparatus embodying the inventive principle;

IFG. 2 is a view in top plan of the inventive towing apparatus;

FIG. 3 is an enlarged fragmentary view in side elevation of the structure for hitching the towing apparatus to the towing vehicle; and FIG. 4 is an enlarged sectional view of the ski connecting portion of the inventive towing apparatus.

DESCRIPTION OF THE PREFERRED EMBODIMENT

With initial reference to FIG. 1, a disabled snowmobile 11 is shown being towed by a snowmobile 12 with the use of towing apparatus embodying the inventive principle and represented generally by the numeral 13. With additional reference to FIG. 2, towing apparatus comprises a frame formed from a first elongated member 14, a second elongated member 15 and an extensible adjustment member 16 transversely connected between the members 14 and 15 to define a triangle. In the preferred embodiment, the members 14—16 are constructed primarily of steel rod having a diameter of five-sixteenths inch.

A threaded member 17 is rigidly secured to the extreme forward end of elongated member 14, projecting forwardly for threaded engagement with a hitch 18. The extreme forward end of the elongated member 15 is threaded to receive a clevis member 19, which is pivotally and removably connected to the member 17 by a hinge pin 21 and cotter pin 22 (FIG. 3). As such, the elongated member 15 is movable relative to elongated member 14, which is rigidly secured to the hitch 18 for a purpose described below.

Hitch 18 comprises a rectangular block 23 having a threaded receptacle into which threaded member 17 is screwed. Block 23 also has a spherical socket formed in a forward portion which receives a threaded ball hitch member 24. Snowmobile 12 includes a rearwardly projecting bar 25 having an aperture formed therethrough to receive the hitch member 24. A lock nut 26 secures the hitch 18 to the snowmobile 12.

The extensible adjustment member 16 comprises a pair of threaded rod members 27, 28, the inner ends of which are connected by a turnbuckle 29. Clevis members 31, 32 are respectively connected to the outer ends of the rods 27, 28 for pivotal connection to the appropriate elongated member 14, 15. It will be noted, however, that clevis member 31 is connected for movement about an essentially horizontal axis by a hinge pin 33 and cotter pin 34; whereas clevis member 32 is connected by a hinge pin 35 and cotter pin 36 for pivotal movement about an essentially vertical axis, similar to the clevis member 19. As described, it will be appreciated that the towing apparatus can be collapsed upon removal of the cotter pin 34 and swinging the members 14–16 into compact alignment.

The rearward ends of the elongated members 14, 15 bend into parallel, spaced relation, each terminating in a ball retaining member (designated 37, 38, respectively). A ski connecting member represented generally by the numeral 39 includes a ball 41 which cooperates with the retaining member 37 to permit multi-directional movement thereof. The ball 41 projects from a rect-angular block 42 having an essentially horizontal slot 43 formed therein to receive the edge of a snowmobile ski (FIG. 4). A threaded bolt 44 screws into the block 42 and projects into the slot 43 to retain the ski edge. A lock nut 45 is used to insure that the bolt 44 will remain in its ski engaging position. An identical ski connecting member 39 is connected to the ball retaining member 38 of elongated rod member 15.

In operation, the apparatus 13 is first assembled into the triangular configuration by the insertion of hinge pins 22, 33, 35 and cotter pins 22, 34, 36. Next, the towing apparatus 13 is positioned so that the ski connecting members 39 and 46 are positioned adjacent the inside edges of the snowmobile skis. Turn-buckle 29 is rotated in an appropriate direction to adjust the frame width and permit entry of the inside ski edges into the slots 43 of blocks 42. Threaded bolt 44 and lock nut 45 are then turned until the ski edge is secured. Hitch 18 is then connected to the projecting bar 25 of towing snowmobile 12 by insertion of hitch member 24 therethrough and screwing the lock nut 26 thereon.

Because of the rigid elongated members 14, 15, operating through a single hitch point to the spaced ski connecting members 39 and 46, the disabled snowmobile 11 is easily and effeciently towed with forward movement of the snowmobile 12. Any up and down turning movement of the skis of disabled snowmobile 11, as caused by terrain irregularities, is taken up by the multi-direction pivotal connection of the ball 41 to the retaining member 37. The hinge pin 33 acting between extensible member 16 and elongated member 14 compensates for up and down movement of one ski relative to the other; and the ball hinge 18 permits pivotal or articulated movement between the snowmobiles 11 and 12. The use of ball joints and pivotal connections at the principal points of interconnection permits freedom of movement on the part of each snowmobile during a towing operation, and the rigid connection of elongated member 41 to the threaded member 17 (and therefore the hitch 18) prevents mishaps when the towing snowmobile 12 must be braked.

When towing is completed, the apparatus 13 is removed from the snowmobiles 11 and 12 and collapsed for storage within the snowmobile itself. This may be accomplished simply by removing the cotter pin 34 and swinging the extensible member 16 and elongated member 14 into alignment with elongated member 15. If further disassembly is required, the cotter pins 22 and 36 may also be removed to completely dismantle the triangular frame.

We claim:

1. Apparatus for towing snowmobiles, comprising:
   a. first and second elongated members each having first and second ends;
   b. hitch means secured to the first end of one of said elongated members;
   c. the first end of the other elongated member being pivotally connected to said one elongated member rearwardly of the hitch means;
   d. an extensible member having first and second ends, the first end being removably and pivotally connected to said first elongated member for movement about an essentially horizontal axis, the second end of the extensible member being pivotally connected to the second elongated member for movement about an essentially vertical axis, the extensible member being disposed to define a triangular frame with said first and second elongated members;
   e. and ski connecting means pivotally carried by each of the first and second elongated members proximate the second end thereof, each of said ski connecting means comprising a member defining an essentially horizontal slot sized and arranged to receive the edge of a snowmobile ski, and means for clamping said snowmobile ski edge in said slot.

2. The apparatus defined by claim 12, wherein the hitch means is rigidly secured to said one elongated member.

3. The apparatus defined by claim 1, wherein the extensible member comprises:
   (a) first and second threaded rod members interconnected by a turnbuckle, the outer ends of the first and second rod members being pivotally connected to the first and second elongated members, respectively.

4. The apparatus defined by claim 1, wherein the hitch means comprises a ball joint hitch.

5. The apparatus defined by claim 1, wherein the ski retaining means comprises a threaded bolt disposed to project into the slot upon rotation thereof.

6. The apparatus defined by claim 1, wherein each of said first and second connecting means is connected to its respective elongated member by means of a ball joint for multi-directional pivotal movement with respect thereto.

* * * * *